April 30, 1968  R. WAINWRIGHT ETAL  3,380,398
MONORAIL LOCOMOTIVE
Filed April 13, 1965  6 Sheets-Sheet 1

Inventors
Ralph Wainwright &
George Valentine Nash
by Jacobs & Jacobs Attorneys

April 30, 1968  R. WAINWRIGHT ETAL  3,380,398
MONORAIL LOCOMOTIVE
Filed April 13, 1965  6 Sheets-Sheet 2
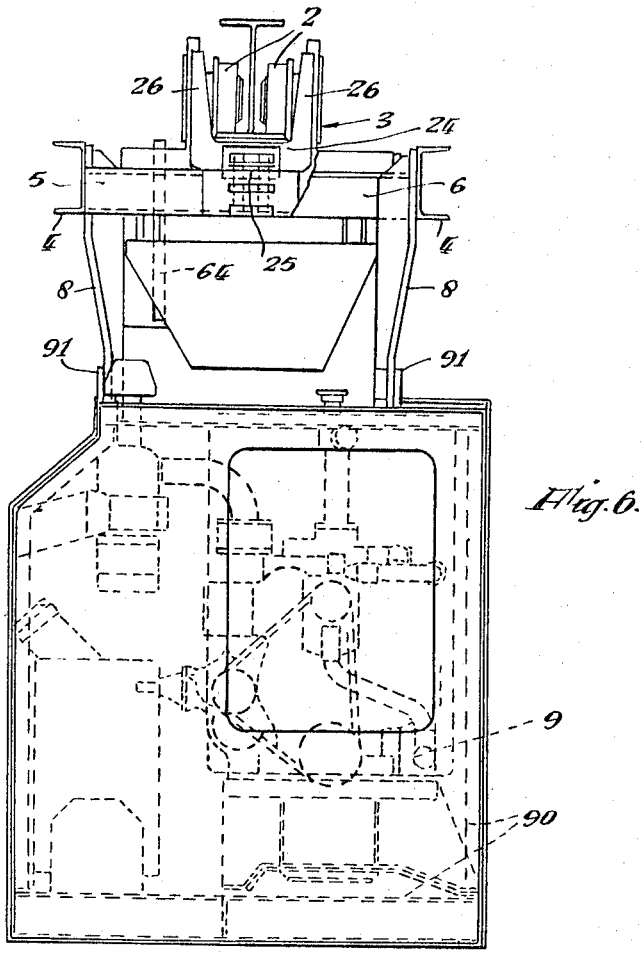
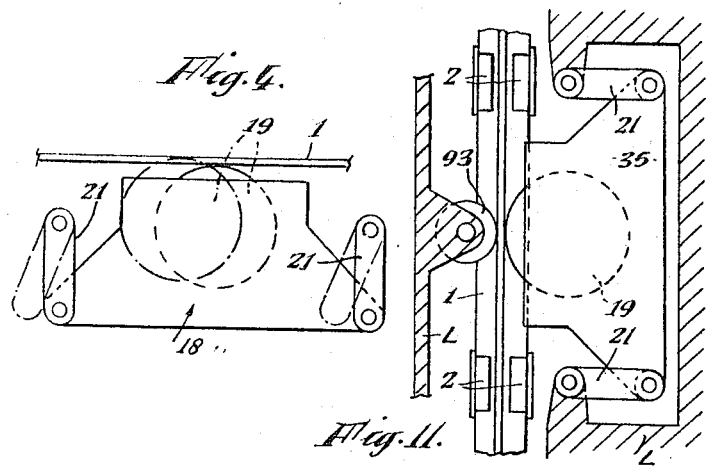

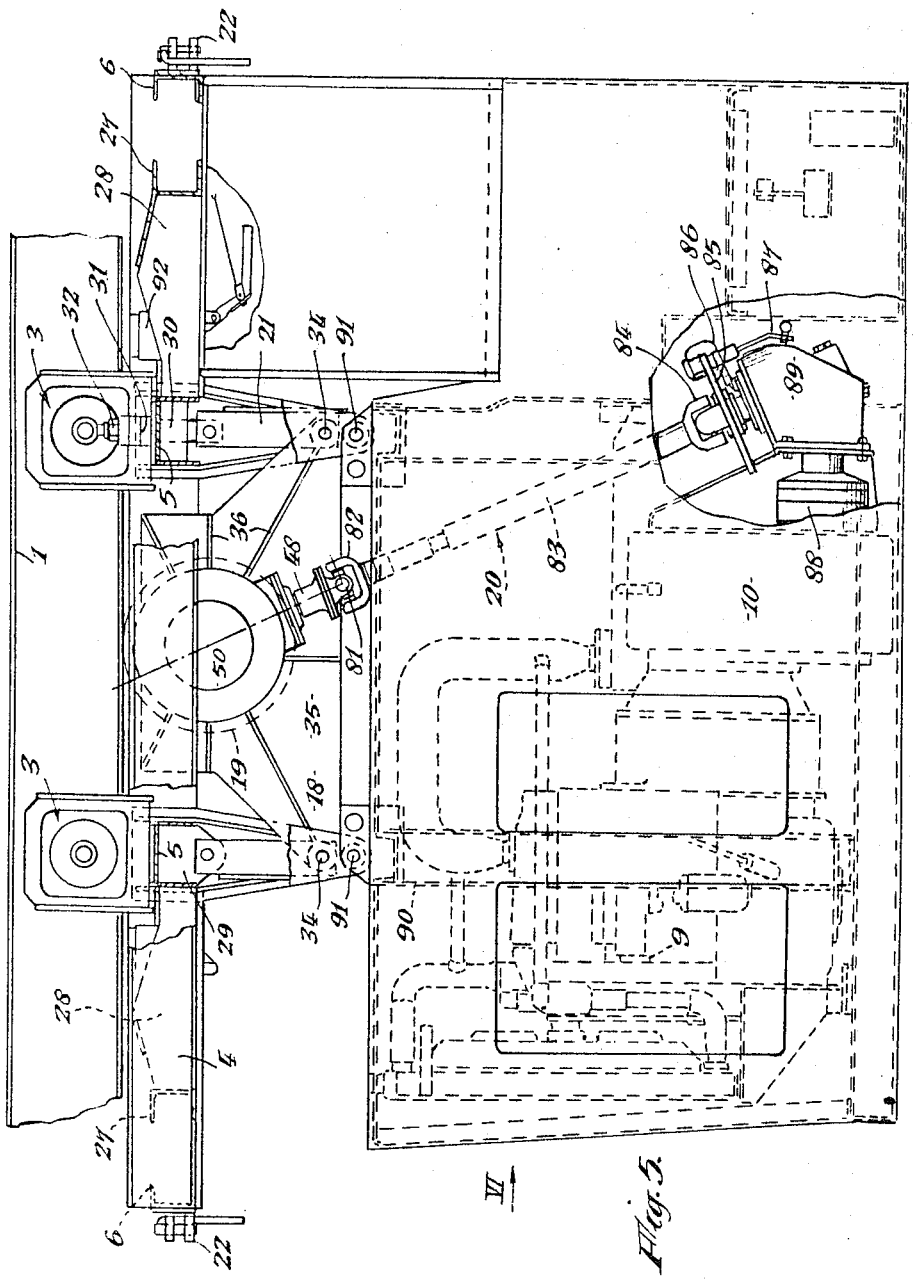

Inventors
Ralph Wainwright
George Valentine Nash
by Jacobs & Jacobs
Attorneys

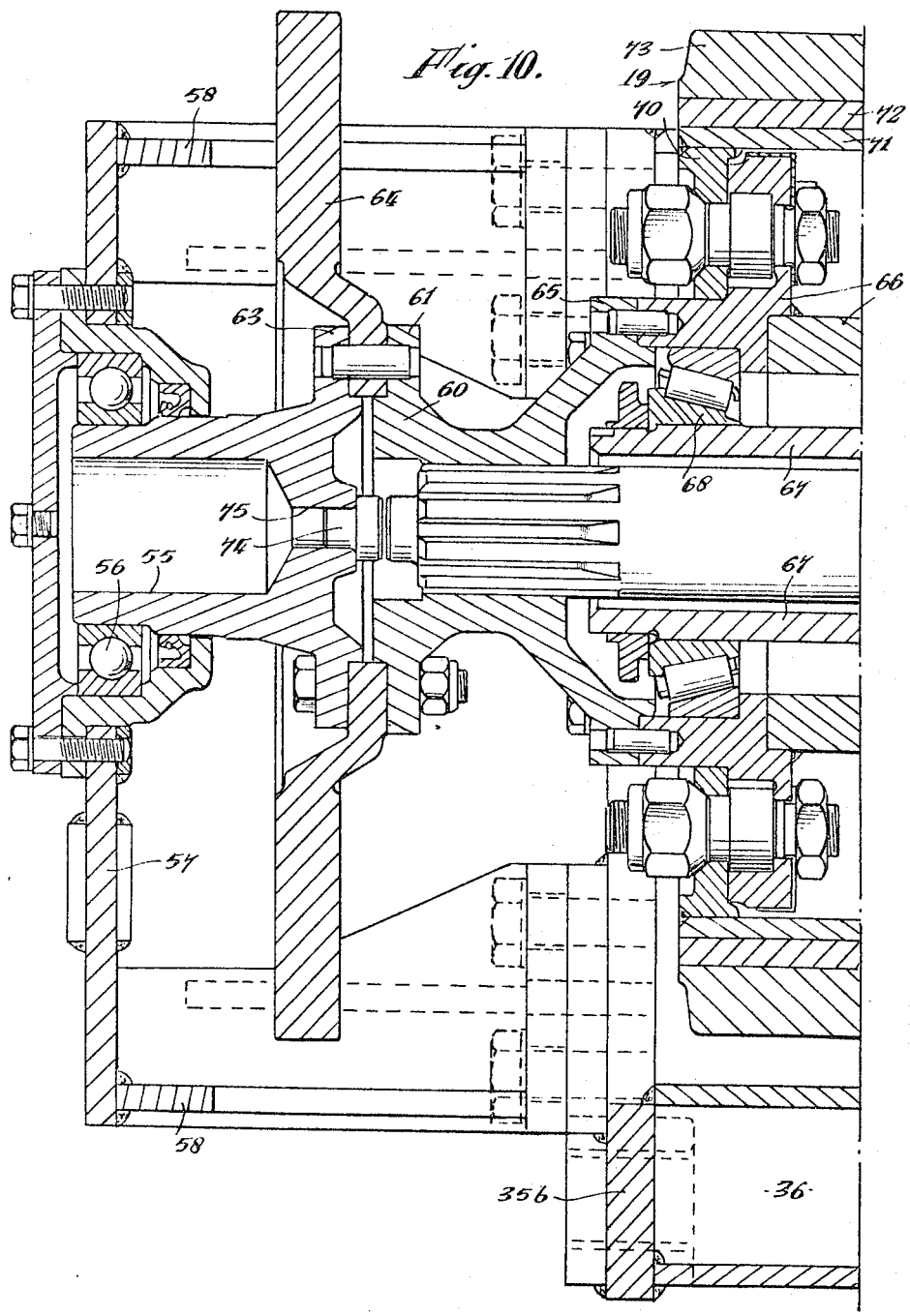

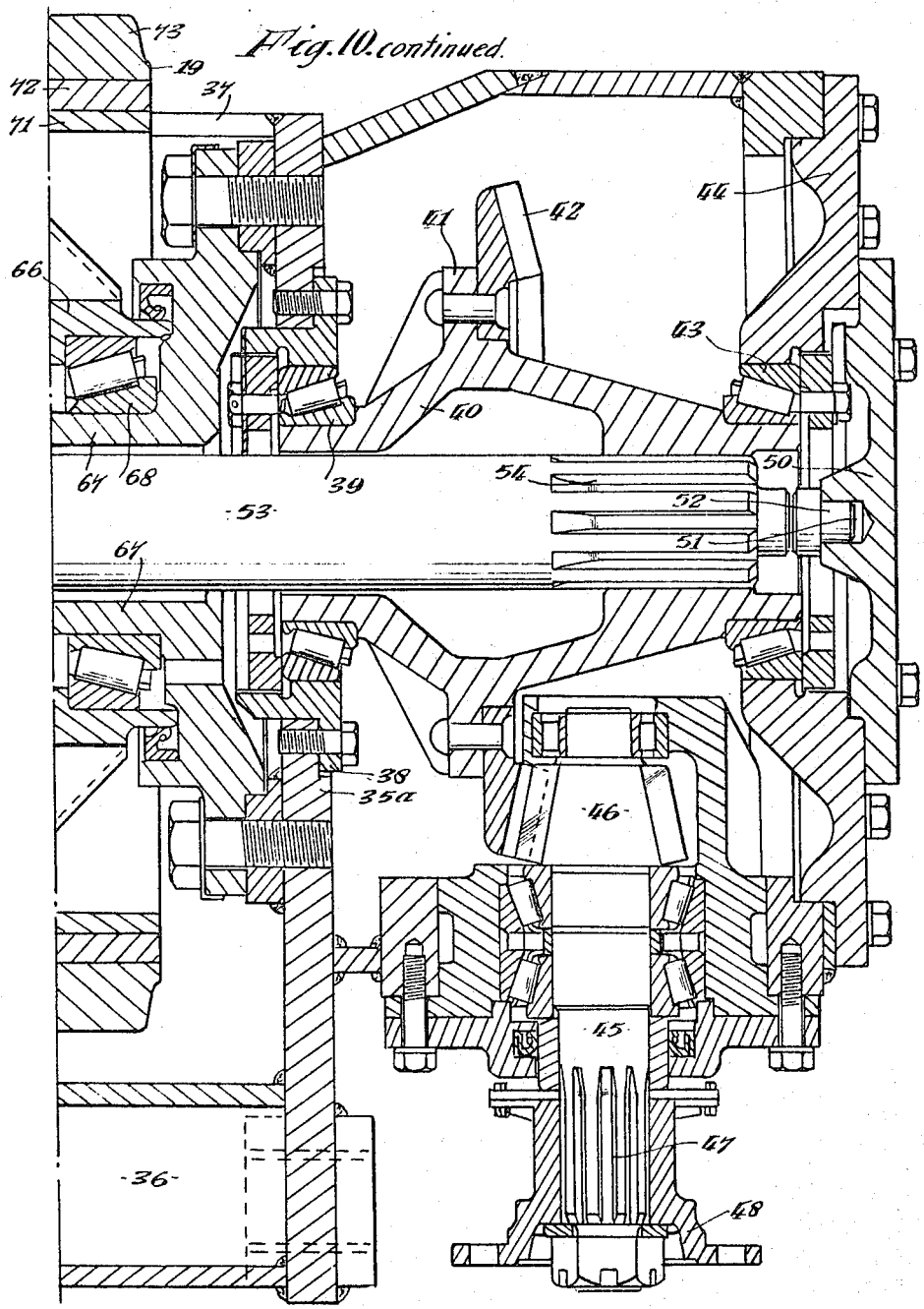

United States Patent Office 3,380,398
Patented Apr. 30, 1968

3,380,398
MONORAIL LOCOMOTIVE
Ralph Wainwright, Wakefield and George Valentine Nash, Hoylandswaine, near Sheffield, England, assignors to Qualter, Hall & Co. (Sales) Limited, Barnsley, England, a company of Great Britain and Northern Ireland
Filed Apr. 13, 1965, Ser. No. 447,856
Claims priority, application Great Britain, Apr. 17, 1964, 16,105/64; Jan. 18, 1965, 2,131/65
7 Claims. (Cl. 105—30)

ABSTRACT OF THE DISCLOSURE

A monorail locomotive having improved tractive operation is obtained by the construction which comprises a monorail locomotive which comprises a rigid body, running wheels fixedly but rotatably attached to said body for supporting engagement with a face of a monorail track to hold the body in a fixed attitude relative to the track, a drive unit swingably mounted to said body, a drive motor fast with the body, a driving and braking wheel extending from said swingably mounted drive unit to engage another face of the track adjacent that of the running wheels, means for transmitting force from said motor to said driving and braking wheel, said drive unit being swingably mounted by means of pivoted swinging link arms, and means for urging the driving and braking wheel into engagement with said another face of the track, when the driving wheel tends to run on the track at a speed greater than that at which the locomotive body is moving the wheel runs in advance of the body with respect thereto and when the wheel tends to run on the track at a speed less than that at which the body is moving, the wheel runs behind the body with respect thereto and acts as a brake, in each position displacement results of the drive unit on the swinging link arms in an arcuate path approximately parallel to the track thus varying the pressure with which the driving and braking wheel engages said another face of the track.

---

This invention relates to monorail locomotives which have counter rollers acting on one surface of the track and a driving or braking wheel acting on another surface of the track so as to exert a pressure between them.

It is an object of this invention to provide a locomotive which exerts pressure on the track which is dependent on the needs of the moment, that is, on the control effort being exerted by the driving wheel, that is, the braking or driving effort being exerted by that wheel. The invention provides a locomotive which accomplishes this in a reliable and mechanically efficient manner.

It is a further object of the invention to provide a locomotive in which the pressure exerted on the track is determined solely by the tractive or braking effort being exerted by the driving or braking wheel and is not interfered with by any load attached to the locomotive. To this end, we mount the driving or braking wheel displaceably in the locomotive frame and provide drawbar means attached directly to the locomotive frame.

Another object of the invention is to provide a locomotive which is stable on its track while allowing for the change in pressure on that track by mounting running wheels of the locomotive in such a way that the locomotive frame maintains a substantially constant attitude relative to the track and, preferably though not necessarily, mounting the driving or braking wheel so as to exert pressure on the track between two such running wheels.

Another object of the present invention is to provide a locomotive with a drive wheel movable in the locomotive body so that when tractive effort is applied, an increased pressure against a track without any corresponding motion of the locomotive body is achieved.

The objects of the invention are particularly valuably achieved in locomotives which are for use in mine installations where loads may vary within very large limits as also may the inclination of track sections. It is, therefore, a still further object of the invention to provide a locomotive which exerts ample pressure on the track to ensure efficient ascent or descent of an incline without any loss of control or frictional grip, but at the same time reduces to a minimum the pressure which is exerted on the track on level sections or when the locomotive is experiencing little load. Although, as we have said, these conditions are most usually met with in mining engineering it is obvious that locomotives according to the invention will be useful in other spheres of railway engineering.

Other objects and advantageous features of the invention will become apparent from the following description, given by way of example only, with reference to the accompanying drawings wherein:

FIGURE 4 is a diagrammatic view showing the engagement of the driving and braking wheel with the track as the drive unit is displaced as the link arms swing in an arcuate path;

FIGURE 5 is a cut-away side elevation of the embodiment of FIGURE 1;

FIGURE 6 is an end view;

FIGURE 10 is a diametrical section of a final drive unit of the embodiment;

FIGURE 11 shows diagrammatically in plan view part of a second embodiment of the present invention wherein the driving and braking wheel engages a vertical web of the track.

Figure 1:
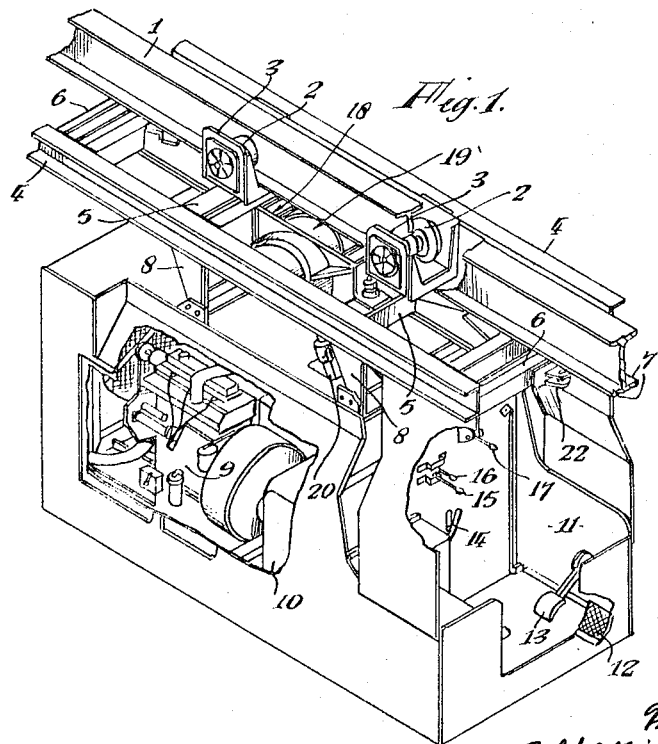
FIGURE 1 is a perspective and cut-away view of the embodiment of the present invention.
Figure 8:
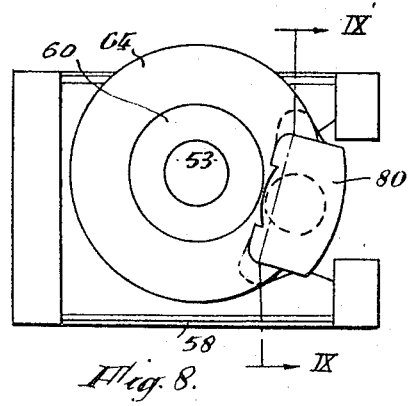
FIGURE 8 is a detail of the brake assembly.
Figure 7:
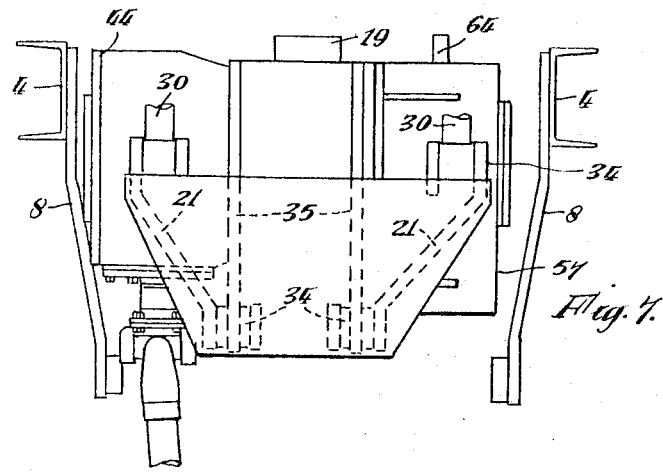
FIGURE 7 is a detail of FIGURE 5.
Figure 9:
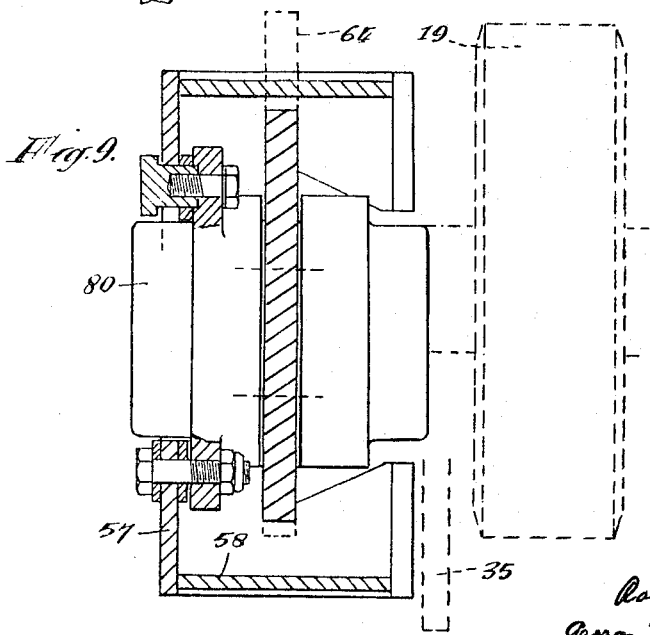
FIGURE 9 is a section taken along the line IX—IX FIGURE 8.

A general layout of a monorail locomotive embodying the present invention is shown in FIGURE 1. The locomotive is shown suspended from a monorail track 1 formed of an I-section girder. Running wheels 2 of the locomotive are borne in bogies 3 which are rotatable about a vertical axis on a supporting framework formed of side members 4 and cross members 5, 6, below which is slung the body of the locomotive. The locomotive has a rigid frame, and the running wheels 2 are thereby supported fixedly but rotatably (about two axes) relative to the locomotive frame. They run upon an upward facing horizontal surface 7 of the monorail track 1. The locomotive body is fixedly slung from the side members 4 by means of arms 8, and has a rigid structural framework (forming part of the rigid frame of the locomotive) on which is fixedly supported a diesel engine 9, a torque converter 10 and a driving cabin 11. The controls shown in the driving cabin are respectively an accelerator pedal 12, a foot brake pedal 13, a hand brake lever 14, a forward reverse lever 15, a gear selector lever 16, and an engine stop lever 17, all of which are linked with various operating parts of the locomotive in a known manner.

Figure 2:
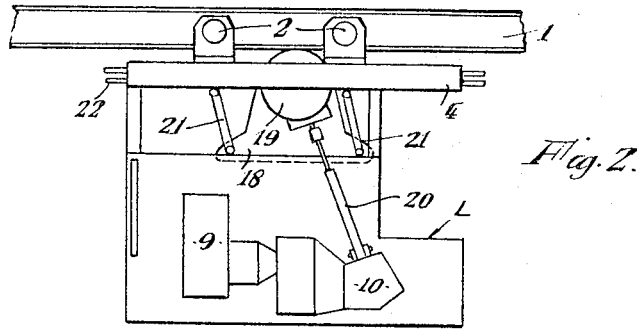
FIGURE 2 is a diagrammatic side elevational view showing the locomotive moving from left to right with the driving and braking wheel driving the locomotive in that direction.
Figure 3:
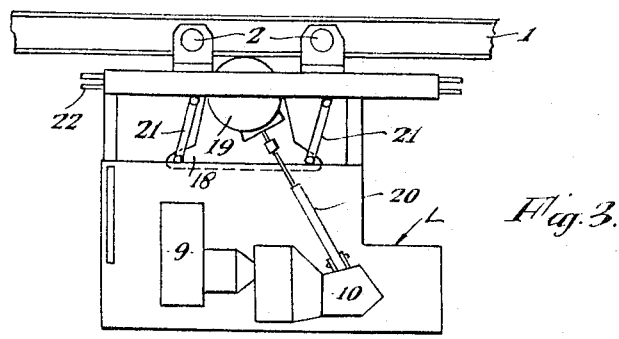
FIGURE 3 is a diagrammatic side elevational view showing the locomotive when a train tends to overrun the locomotive; the locomotive frame is pushed forward of the driving and braking wheel and said wheel exerts increased pressure on the track.

Below and between the two bogies 3 there is slung a final drive unit 18 in which there is mounted rotatably a driving and braking wheel 19. The wheel will run on a downward facing horizontal surface below the surfaces 7 of the monorail track. The driving wheel is slung below the cross members 5 to be movable in a longitudinal direction relative to the locomotive frame, to engage the track between the positions of engagement of the running wheels. Drive is communicated to the driving wheel 19 through transmission means such as shaft 20 and torque converter 10. The locomotive frame includes the supporting framework 4, 5, 6, and is held by the running wheels in a fixed attitude relative to the track (except of course when negotiating a corner or a change of inclination) but the final drive unit is movably slung and the effect of this is shown in FIGURES 2 and 3 which diagrammatically illustrate the principle of this embodiment of the invention.

The locomotive frame (L in these figures) is supported by the running wheels 2 in a fixed attitude relative to the track 1. The driving wheel 19, running against a downward facing horizontal surface of this track, is slung in its final drive unit 18 on pairs of pivoted parallel swinging link arms 21 in such a way that if the wheel 19 tends to rotate at a speed greater or less than that at which the locomotive frame is moving the wheel 19 runs in advance of it or behind it and causes displacement of the swinging link arms 21 in an arcuate path in a vertical plane. In FIGURE 2, the locomotive is assumed to be moving to the right of the figure and the wheel 19 is driving the locomotive in that direction. Tractive effort which is being exerted by the locomotive prime mover through that driving wheel causes those ends of the link arms 21 which are attached to the final drive unit 18 to move in an arcuate path, and since the wheel 19 is closely applied against the rail when those link arms project perpendicularly from the rail and the place of attachment of the link arms 21 to the locomotive cannot move away from the rail, any such arcuate movement of those arms causes the wheel to be applied more strongly (FIGURE 4), thus increasing the pressure and the frictional interaction between the rail and the driving wheel. Reaction to this pressure is taken up by the running wheels 2. This alteration in pressure is particularly required when strong driving effort is being exerted as in FIGURE 2 or when, as in FIGURE 3, the wheel is braking causing it to run behind the motion of the locomotive. These effects occur even when the locomotive is running light but a load can be attached directly to the locomotive frame through a drawbar 22 fast with the cross members 6. This draw bar always communicates any load experienced as the result of attachment of tubs or trucks directly to the frame of the locomotive, even though the drawbar might be constituted by a swivelling hook or the like rather than the lug which has been illustrated. Then, if a train of tubs tend to overrun the locomotive, the locomotive frame will be pushed forwardly of the driving wheel (FIGURE 3) and an increase in pressure on the track and efficiency in grip by the locomotive on the track will result.

The construction of the locomotive will now be described in more detail with reference to FIGURES 5 to 10. The bogies 3 which support the running wheels 2 are built up into a U-shape with a base 24 which is pivotally secured to a vertical axle 25 which passes into a housing in the intermediate cross members 5. The upstanding opposite side walls 26 of the U each provide a mount for a stub axle on which the running wheels 2 are rotatable. The angle or cross members 5 are of built-up channel section and extend between channel section side members 4. Cross members 6 are provided at each extreme end of the side members 4 and supplementary cross members 27 reinforce the ends of the locomotive. A median web 28 extends between each intermediate cross member 27 and its nearest cross member 5. One of the cross members 5 has a pair of plates 29 disposed one each side of the centre line of the locomotive for the attachment each of a swinging link arm 21. The other cross member 5 has a pair of apertures in its uppermost surface each aperture being suitably bushed for the reception of a rod 30 pivotally attached to one of a section pair of swinging link arms 21. The rod 30 passes slidably through the bushing to project above the cross member 5, where disc springs 31 or any other suitable resilient material surround the rod 30 and are compressed between an adjustable stop 32 screwthreadedly engaged to the end of the rod 30 and the cross member 5. The springs 31 apply pre-loading to the final drive unit 18 so that the driving wheel is maintained, even when at rest, in engagement with the track 1. The pressure of this engagement is adjustable by the stop 32.

The ends of the swinging link arms 21 remote from the plate 29 or rod 30 are pivotally attached, at 34, to side plates 35 of a final drive unit. The side plates are generally trapezoid in shape with a rectangular uppermost portion and are reinforced by ribs 36 radiating from an aperture which provides for the passage of a shaft of the driving wheel 19. The construction which is about to be described is best followed with the aid of FIGURES 7 to 10.

These show that the swinging link arms 21 are cranked and converge towards the longitudinal center line of the locomotive inwardly from the rod 30 or plate 29, because the distance between the side plates 35 is less than that between rods 30 or plates 29. The side plates 35 are spaced apart at their base by a built up member 36 and by plates 37 one at each extreme top end portion of the plates 35. The arrangement of the driving wheel 19 is such that it protrudes, between the plates 37 in front of and behind it, above the level of the uppermost edge of the plates 35.

One plate 35a has an aperture within which is secured a housing 38 on which runs, through a roller bearing 39, one end of a hollow shaft 40 directed away from the plate 35a which has a flange portion with which is fast a bevel ring gear 42. The end of the hollow shaft 40 remote from the plate 35a is supported through a roller bearing 43 in the outermost side wall 44 of a built up box, through the cylindrical wall of which passes a drive shaft 45. A bevel gear 46 fast with the shaft 45 meshes with the bevel ring 42. The drive shaft 45 is splined at 47 to be keyed to an internally splined driving flange 48. The side wall 44 of the box has a cover plate 50 which at its centre has a blind bore 51 which carries a hardened steel button 52 to limit end float of a main drive shaft 53, splined at 54 to be keyed to the inside of the correspondingly hollow shaft 40. The other end of the main drive shaft 53 is supported by a flanged shaft 55 of which the extreme end is borne by rolling contact bearings 56 in the end wall 57 of a built up box housing a brake mechanism and attached, by upper and lower walls 58 to the other side plate 35b.

The flanged shaft 55 supports the main shaft by a second hollow shaft 60 having a flange 61 at one end which is bolted to the flange 63 of the flanged shaft 55 to trap the inner circumferential edge of a dished brake disc 64. The other end of the second hollow shaft 60 has a second flange 65 with which is fast a built up inner member 66 of the driving wheel 19.

The side plate 35a which has the gear housing box on one of its faces has fixedly secured to the other of its faces a flanged sleeve 67 which extends co-axially of the main drive shaft 53 within the built up inner member 66 of the driving wheel 19 and is separated from it by roller bearings 68. Fast with the built up member 66 is an annular ring 70 bearing a cylindrical ring 71 about which are secured solid tyre layers 72 and 73.

A bore 75 in the flanged shaft 55 carries a hardened steel button 74 to limit end float of the main drive shaft 53.

The brake disc 64 is acted on by a brake caliper 80. This is secured in an aperture in the end wall 57 of the brake housing, which is part of the final drive unit, so that the caliper acts near the circumference of the brake disc 64. The brake caliper is preferably hydraulically powered and is applied by operation of the foot brake pedal 13. Hydraulic fluid is communicated to the caliper brake through a flexible tube.

Returning now to FIGURES 5 and 6 the driving flange 48 is secured to the flange 81 of a universal drive 82 which is driven through a telescopic propeller shaft 83. At its lower end the telescopic propeller shaft 83 is secured through a universal joint 84 to a transmission brake disc 85 adapted to be braked by a brake caliper 86 operated through a linkage 87 by the hand brake 14.

Drive from the diesel engine 9 is communicated to the shaft 83 through a torque converter 10, a coupling 88 and reduction gearing 89.

The diesel engine 9 will be adapted for operation in mines.

The diesel engine is fixedly supported in the locomotive frame on a structural framework indicated at 90 (FIGURES 5 and 6) which is rigidly attached to the supporting framework 4, 5, 6 through the depending arms 8. The attachment between arms 8 and the body structure 90 is made at positions 91. It is to be remembered that the support arms 8 are rigidly attached to the side angle members 4.

An emergency brake 92 can engage directly on the track 1.

In FIGURE 11 there is shown in a diagrammatic fashion a way in which the embodiment may be adapted so that the driving or braking wheel engages the vertical web of a monorail track. Side plates 35 are mounted by parallel swinging link arms 21 to swing in horizontal plane in the longitudinal direction of the locomotive. The driving and braking wheel 19 engages the vertical web of the monorail track 1, but running wheels 2 run upon the horizontal flange of that track and support the locomotive frame and body L in which the driving wheel is mounted. The frame and body L is extended to the side of the monorail track remote from the driving wheel and there there is mounted a reaction roller 93 to take up pressure exerted in pivoting movement of the arms 21. In the embodiment which has been fully described this pressure is, of course, taken up by the running wheels themselves.

A locomotive embodying the invention may readily be adapted to run with its body above a monorail track, the driving or braking wheel engaging an upward facing horizontal of that track and a reaction wheel or wheels running below the track.

A locomotive embodying the invention may have more than one driving or braking wheel. If a final drive unit is mounted on two longitudinally spaced apart arms, or two such pairs of arms, the arms need not be parallel.

What we claim and desire to secure by Letters Patent is:

1. A monorail locomotive which comprises a rigid body, running wheels fixedly but rotatably attached to said body for supporting engagement with a face of a monorail track to hold the body in a fixed attitude relative to the track, a drive unit swingably mounted to said body, a drive motor fast with the body, a driving and braking wheel extending from said swingably mounted drive unit to engage another face of the track adjacent that of the running wheels, means for transmitting force from said wheel extending from said swingably mounted drive unit being swingably mounted by means of pivoted swinging link arms, and means for urging the driving and braking wheel into engagement with said another face of the track, when the driving wheel tends to run on the track at a speed greater than that at which the locomotive body is moving the wheel runs in advance of the body with respect thereto and when the wheel tends to run on the track at a speed less than that at which the body is moving, the wheel runs behind the body with respect thereto and acts as a brake, in each position displacement results of the drive unit on the swinging link arms in an arcuate path approximately parallel to the track thus varying the pressure with which the driving and braking wheel engages said another face of the track.

2. A monorail locomotive according to claim 1 wherein the driving and braking wheel runs on a downward facing horizontal surface of the track.

3. A monorail locomotive according to claim 2 wherein the body includes a substantially horizontal upper frame bearing the pivoted swinging link arms and the running wheels, drawbars of the locomotive fast with the longitudinal ends of the frame, and a portion of the body rigidly suspended from the frame and containing the drive motor.

4. A monorail locomotive according to claim 1 wherein the link arms are pivotably attached to the frame and to the drive unit at one side of the monorail track.

5. A monorail locomotive according to claim 1 wherein two pairs of link arms pivotably connect the drive unit and frame, all the link arms being parallel.

6. A monorail locomotive according to claim 1 wherein the means for urging the driving and braking wheel toward the track comprises resilient loading means disposed on at least one of the pivotal link arms.

7. A monorail locomotive according to claim 1 having more than one driving and braking wheel.

References Cited

UNITED STATES PATENTS

| | | | |
|---|---|---|---|
| 574,316 | 12/1896 | Feldmann | 105—153 |
| 1,602,464 | 10/1926 | Stedefeld | 105—152 |
| 2,018,087 | 10/1935 | Plass | 105—153 |
| 3,101,678 | 8/1963 | Grube | 105—153 X |
| 2,063,471 | 12/1936 | Stedefeld | 74—330 |
| 2,608,163 | 8/1952 | Martin | 105—153 |
| 3,056,359 | 10/1962 | Fey | 104—95 |
| 3,074,354 | 1/1963 | Wakkila | 104—93 |
| 3,129,671 | 4/1964 | Vanderbeck | 105—153 |
| 3,137,246 | 6/1964 | Meinardi | 105—148 |
| 3,176,628 | 4/1965 | Reid | 105—73 |

FOREIGN PATENTS

| | | |
|---|---|---|
| 211,619 | 7/1909 | Germany. |
| 432,859 | 8/1926 | Germany. |

ARTHUR L. LA POINT, *Primary Examiner.*

B. FAUST, H. BELTRAN, *Assistant Examiners.*